(12) United States Patent
Lee et al.

(10) Patent No.: US 11,698,224 B2
(45) Date of Patent: Jul. 11, 2023

(54) REFRIGERATOR

(71) Applicant: Samsung Electronic Co., Ltd., Suwon-si (KR)

(72) Inventors: Dongho Lee, Suwon-si (KR); Youngil Song, Suwon-si (KR); Jisu Rhie, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/851,779

(22) Filed: Jun. 28, 2022

(65) Prior Publication Data

US 2022/0325948 A1 Oct. 13, 2022

Related U.S. Application Data

(63) Continuation of application No. 16/950,744, filed on Nov. 17, 2020, now Pat. No. 11,512,895.

(30) Foreign Application Priority Data

Apr. 8, 2020 (KR) .......................... 10-2020-0043011

(51) Int. Cl.
*F25D 29/00* (2006.01)
*F25D 23/02* (2006.01)
*G06F 3/041* (2006.01)

(52) U.S. Cl.
CPC ......... *F25D 29/005* (2013.01); *F25D 23/028* (2013.01); *F25D 2400/361* (2013.01); *G06F 3/041* (2013.01)

(58) Field of Classification Search
CPC ................ F25D 29/005; F25D 23/028; F25D 2400/361; F25D 2323/02; F25D 2323/021; F25D 2400/18
See application file for complete search history.

(56) References Cited

U.S. PATENT DOCUMENTS 8,382,220 B2   2/2013 Kim
8,783,801 B2 * 7/2014 Kaplan ................ F25D 29/005
                                              312/405.1

(Continued)

FOREIGN PATENT DOCUMENTS

CN        102149997 A      8/2011
CN        208139671 U     11/2018

(Continued)

OTHER PUBLICATIONS

International Search Report dated Apr. 29, 2021, in corresponding International Patent Application No. PCT/KR2021/001067.

(Continued)

*Primary Examiner* — Hanh V Tran
(74) *Attorney, Agent, or Firm* — Staas & Halsey LLP

(57) ABSTRACT

The refrigerator includes a door including a door body and a front panel coupled to a front surface of the door so to cover a front surface of the door body. The front panel includes a display including a screen on which an image is displayed, and a glass panel provided in front of the display. The glass panel includes a glass member and a decorative layer formed in an area other than an area corresponding to the screen of the display among an entire area of the glass member. The front panel includes a support plate coupled to the glass panel and including a display mounting portion on which the display is mounted.

8 Claims, 16 Drawing Sheets

(56) References Cited

U.S. PATENT DOCUMENTS

| | | | |
|---|---|---|---|
| 11,320,192 B2* | 5/2022 | Lee | F25D 23/028 |
| 2007/0188059 A1 | 8/2007 | Davis | |
| 2008/0042537 A1* | 2/2008 | Kim | F25D 23/02 |
| | | | 312/405 |
| 2008/0231159 A1 | 9/2008 | Lee | |
| 2012/0073202 A1* | 3/2012 | Lee | F25D 29/005 |
| | | | 49/70 |
| 2012/0169196 A1* | 7/2012 | Marchetti | E06B 5/006 |
| | | | 312/265.6 |
| 2014/0144083 A1 | 5/2014 | Artwohl | |
| 2014/0232958 A1 | 8/2014 | Venturas | |
| 2015/0052920 A1 | 2/2015 | Park | |
| 2016/0178277 A1* | 6/2016 | Park | G06F 3/0416 |
| | | | 345/173 |
| 2017/0059875 A1 | 3/2017 | Seung | |
| 2017/0370631 A1* | 12/2017 | Kim | F25D 23/006 |
| 2017/0370636 A1 | 12/2017 | Koo | |
| 2018/0164033 A1 | 6/2018 | Lee | |
| 2018/0192791 A1 | 7/2018 | Miller | |
| 2018/0209722 A1 | 7/2018 | Koo et al. | |
| 2018/0274852 A1 | 9/2018 | Kang | |
| 2019/0249485 A1 | 8/2019 | Jeong | |
| 2019/0249919 A1 | 8/2019 | Koo et al. | |
| 2019/0257571 A1 | 8/2019 | Park et al. | |

FOREIGN PATENT DOCUMENTS

| | | |
|---|---|---|
| CN | 109923358 A | 6/2019 |
| CN | 106766504 B | 12/2019 |
| EP | 3 505 853 A1 | 7/2019 |
| KR | 2003-0084071 A | 11/2003 |
| KR | 10-0683818 | 2/2007 |
| KR | 10-2015-0095042 | 8/2015 |
| KR | 10-2017-0009562 A | 1/2017 |
| KR | 10-2018-0067367 | 6/2018 |
| KR | 10-2025326 B1 | 11/2019 |
| RU | 139 846 U1 | 4/2014 |
| WO | WO 2010/029042 A1 | 3/2010 |
| WO | WO 2018/021668 A1 | 2/2018 |

OTHER PUBLICATIONS

European Search Report dated Nov. 23, 2021, in European Application No. 21701196.4-1009.
Office Action dated Dec. 10, 2021, in Russian Application No. 2021104604/10(010152).
Russian Search Report dated Dec. 9, 2021 in Application No. 202110464/10(010152).
Office Action dated Sep. 29, 2021, in U.S. Appl. No. 16/950,744.
Notice of Allowance dated Mar. 25, 2022, in U.S. Appl. No. 16/950,744.
U.S. Appl. No. 16/950,744, filed Nov. 17, 2020, Dongho Lee, Samsung Electronics Co., Ltd.
Office Action dated Aug. 23, 2022, issued in Chinese Application No. 202180000270.0.

* cited by examiner

REFRIGERATOR

CROSS-REFERENCE TO RELATED APPLICATION

This application is a continuation of U.S. Ser. No. 16/950,744, filed Nov. 17, 2020, and is based on and claims priority under 35 U.S.C. § 119 to Korean Patent Application No. 10-2020-0043011, filed Apr. 8, 2020, in the Korean Intellectual Property Office, the disclosures of which are incorporated by reference herein in their entireties.

BACKGROUND

1. Field

The disclosure relate to a refrigerator, more particularly to a refrigerator in which a display is provided on a door.

2. Description of Related Art

A refrigerator is a home appliance that keeps food fresh by including a body including a storage compartment, a cold air supply device configured to supply cold air to the storage compartment, and a door configured to open and close the storage compartment.

Recently, a display has been provided on the door of the refrigerator to allow a user to check a state of the storage compartment without opening the door, to run various applications (Apps), or to perform an Internet of Things (IOT) function.

SUMMARY

It is an aspect of the disclosure to provide a refrigerator having improved aesthetics of a door including a display.

It is another aspect of the disclosure to provide a refrigerator capable of easily mounting a display to a door and removing the display from the door.

It is another aspect of the disclosure to provide a refrigerator including a door provided with a display in which an assembly structure of the door is simplified and the number of components of the door is reduced.

It is another aspect of the disclosure to provide a refrigerator capable of easily changing the design of a door including a display.

In accordance with an aspect of the disclosure, a refrigerator includes a main body including a storage compartment, and a door including a door body and a front panel coupled to a front surface of the door so to cover a front surface of the door body, the door configured to open and close the storage compartment. The front panel includes a display including a screen on which an image is displayed, a glass panel provided in front of the display and including a glass member and a decorative layer formed in an area other than an area corresponding to the screen of the display among an entire area of the glass member, and a support plate coupled to the glass panel and including a display mounting portion on which the display is mounted.

The support plate may include an opening formed to have a size corresponding to a size of the screen to allow the screen to be exposed.

The display mounting portion may include an upper support portion configured to support an upper end of the display, a lower support portion configured to support a lower end of the display, a left support portion configured to support a left end of the display, and a right support portion configured to support a right end of the display.

The display mounting portion may include a first support portion configured to support a front edge of the display, and a second support portion bent from the first support portion to support an upper surface, a lower surface, a left surface, and a right surface of the display.

The support plate may include a locking hook elastically deformable to fix the display to the display mounting portion.

The support plate may further include a substrate mounting portion on which a circuit board configured to drive the display is mounted, and the substrate mounting portion may be formed under the display mounting portion.

The glass panel may be formed to have a size corresponding to the front surface of the door body so as to cover the entire area of the front surface of the door body.

The glass panel may further include a touch film provided in a transparent area, which corresponds to the screen of the display, of the glass member to receive a signal for the display.

The glass panel may further include a shatterproof film provided in a non-transparent area, in which the decorative layer is formed, of the glass member, so as to prevent the glass member from being shattered.

The front panel may further include a microphone provided behind the glass panel to receive a voice, and the glass panel may further include a through hole formed to receive a voice through the microphone.

The door body may include a door outer case, a door inner case, and an insulating material provided between the door outer case and the door inner case. The door outer case may include a main case including a central opening, and a heat dissipation plate coupled to the central opening to dissipate heat radiated from the display.

The heat dissipation plate may include a display accommodating portion provided to be recessed to accommodate the display.

The heat dissipation plate may include a first heat dissipation plate and a second heat dissipation plate coupled to an outer periphery of the first heat dissipation plate, and the first heat dissipation plate may be formed of a material having a higher thermal conductivity than the second heat dissipation plate.

The front panel may include a lower trim provided in a lower portion of the rear surface of the glass panel and configured to be rotated and coupled to the door body, and an upper trim provided in an upper portion of the rear surface of the glass panel and configured to be coupled to the door body in a state in which the lower trim is coupled to the door body.

The door may further include a fixing member coupled to the upper trim and the door body to fix the upper trim and the door body.

In accordance with another aspect of the disclosure, a refrigerator includes a main body including a storage compartment, and a door including a door body and a front panel coupled to a front surface of the door, the door configured to open and close the storage compartment. The front panel includes a glass panel provided to form the front surface of the door, a support plate coupled to a rear surface of the glass panel and including an opening, and a display including a screen on which an image is displayed, and configured to be mounted to the support plate to allow the screen to be exposed through the opening.

The support plate may include a display mounting portion on which the display is mounted, and a guide rib formed in a lower portion of the display mounting portion so as to guide the display to the display mounting portion.

The support plate may include a locking hook provided to be elastically deformable on left and right sides of the display mounting portion so as to fix the display to the display mounting portion.

The support plate may include a fastening hole formed in an upper portion of the display mounting portion to allow a fastening member to be coupled thereto so as to allow the display to be fixed to the display mounting portion.

In accordance with another aspect of the disclosure, a refrigerator includes a main body including a storage compartment, and a door including a door body and a front panel coupled to a front surface of the door body and including a display. The door body includes a door outer case including a main case including a central opening, the door outer case including a heat dissipation plate coupled to the central opening to dissipate heat radiated from the display, a door inner case, and an insulating material provided between the door outer case and the door inner case.

An aesthetic aspect of a door may be improved because a glass panel is formed to cover an entire area of a front surface of the door.

The display may be easily mounted and removed from the door, and an assembly structure of the door is simplified because a support plate configured to mount and separate the display is provided on a rear surface of the glass panel.

A design of the door may be easily changed by replacing the front panel because the front panel is configured to be easily mounted and detached from a door body.

DETAILED DESCRIPTION

Figure 1:
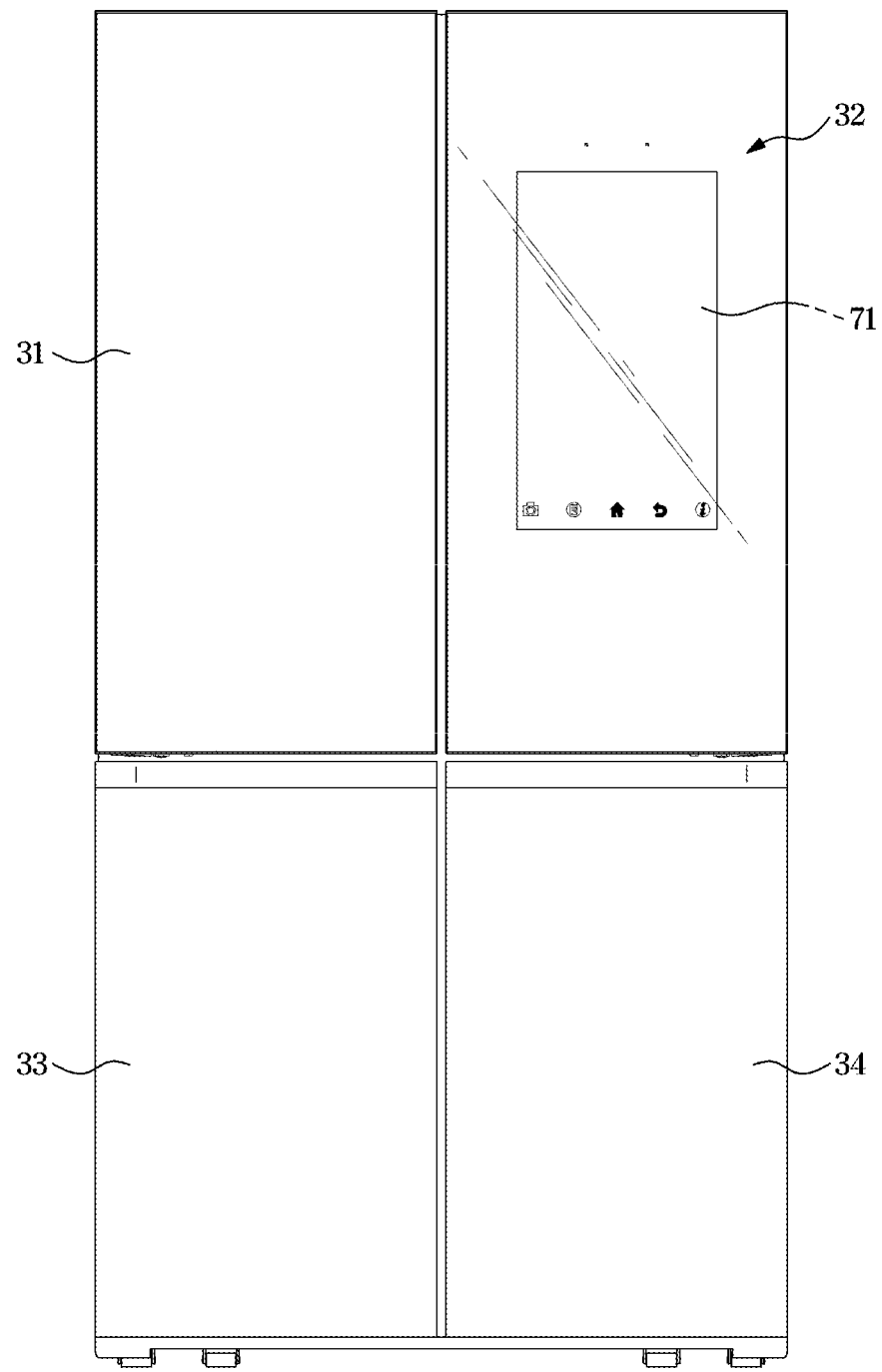
FIG. 1 illustrates a front view of a refrigerator according to an embodiment of the disclosure.

Embodiments described in the disclosure and configurations shown in the drawings are merely examples of the embodiments of the disclosure, and may be modified in various different ways at the time of filing of the present application to replace the embodiments and drawings of the disclosure.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

The disclosure will be described more fully hereinafter with reference to the accompanying drawings.

Figure 2:
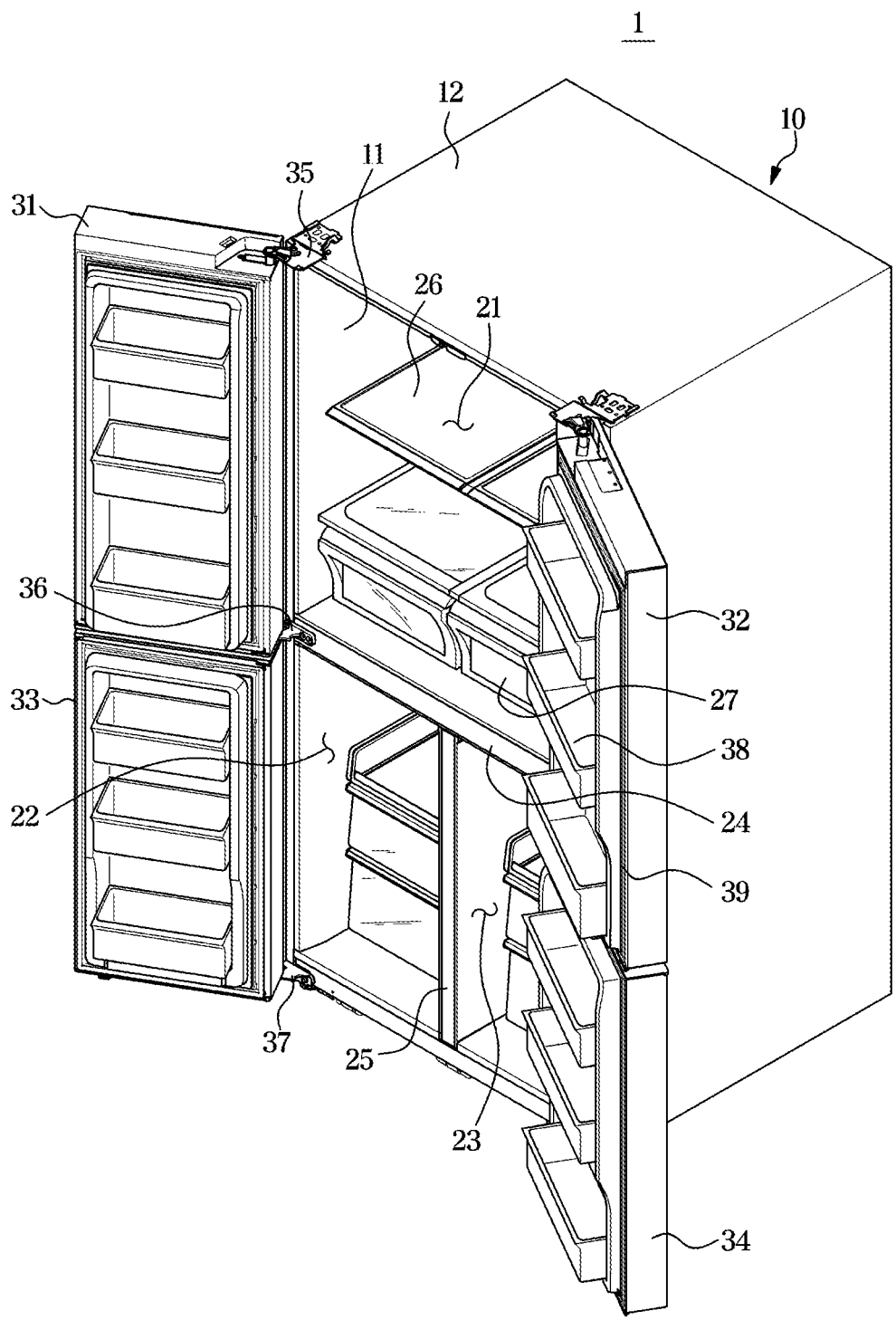
FIG. 2 illustrates a perspective view of the refrigerator of FIG. 1.

FIG. 1 illustrates a front view of a refrigerator according to an embodiment of the disclosure. FIG. 2 illustrates a perspective view of the refrigerator of FIG. 1.

Referring to FIGS. 1 and 2, a refrigerator 1 may include a main body 10, storage compartments 21, 22, and 23 formed inside the main body 10, doors 31, 32, 33, and 34 and a cold air supply device (not shown) configured to supply cold air to the storage compartments 21, 22, and 23.

The main body 10 may include an inner case 11 configured to form the storage compartments 21, 22, and 23, an outer case 12 coupled to the outside of the inner case 11, and an insulating material (not shown) provided between the inner case 11 and the outer case 12 to insulate the storage compartments 21, 22, and 23.

The storage compartments 21, 22, and 23 may be divided into a plurality of storage compartments by a horizontal partition 24 and a vertical partition 25. The storage compartments 21, 22, and 23 may be divided into an upper storage compartments 21 and lower storage compartments 22 and 23 by the horizontal partition 24. The lower storage compartments 22 and 23 may be divided into a lower left storage compartment 22 and a lower right storage compartment 23 by the vertical partition 25.

The upper storage compartment 21 may be used as a refrigerating compartment, and the lower storage compartments 22 and 23 may be used as a freezing compartment. However, the division and use of the storage compartments 21, 22, and 23 as described above are only an example, and are not limited thereto.

A shelf 26 on which food is put and a storage container 27 in which food is placed may be provided inside the storage compartments 21, 22, and 23.

The cold air supply device may generate cold air using a refrigeration circulation cycle of compressing, condensing, expanding, and evaporating the refrigerant, and supply the generated cold air to the storage compartments 21, 22, and 23.

The storage compartment 21 may be opened and closed by the pair of doors 31 and 32. The doors 31 and 32 may be rotatably coupled to the main body 10. The storage compartment 22 may be opened and closed by the door 33, and the door 33 may be rotatably coupled to the main body 10. The right storage compartment 23 may be opened and closed by the door 34, and the door 34 may be rotatably coupled to the main body 10. Hinges 35, 36, and 37 configured to rotatably couple the door 31, 32, 33, and 34 to the main body 10 may be provided in the main body 10.

A door guard 38 configured to store food and a door gasket 39 provided in close contact with a front surface of the main body 10 to seal the storage compartments 21, 22, and 23 may be provided on a rear surface of the doors 31, 32, 33, and 34.

A display 71 may be provided on the doors 31, 32, 33, and 34. The display 71 may display various information related to a state or operation of the refrigerator, or various applications (Apps) for user convenience. According to an embodiment, the display 71 is provided on the door 32, but the display 71 may be provided on other doors 31, 33, and 34.

Figure 3:
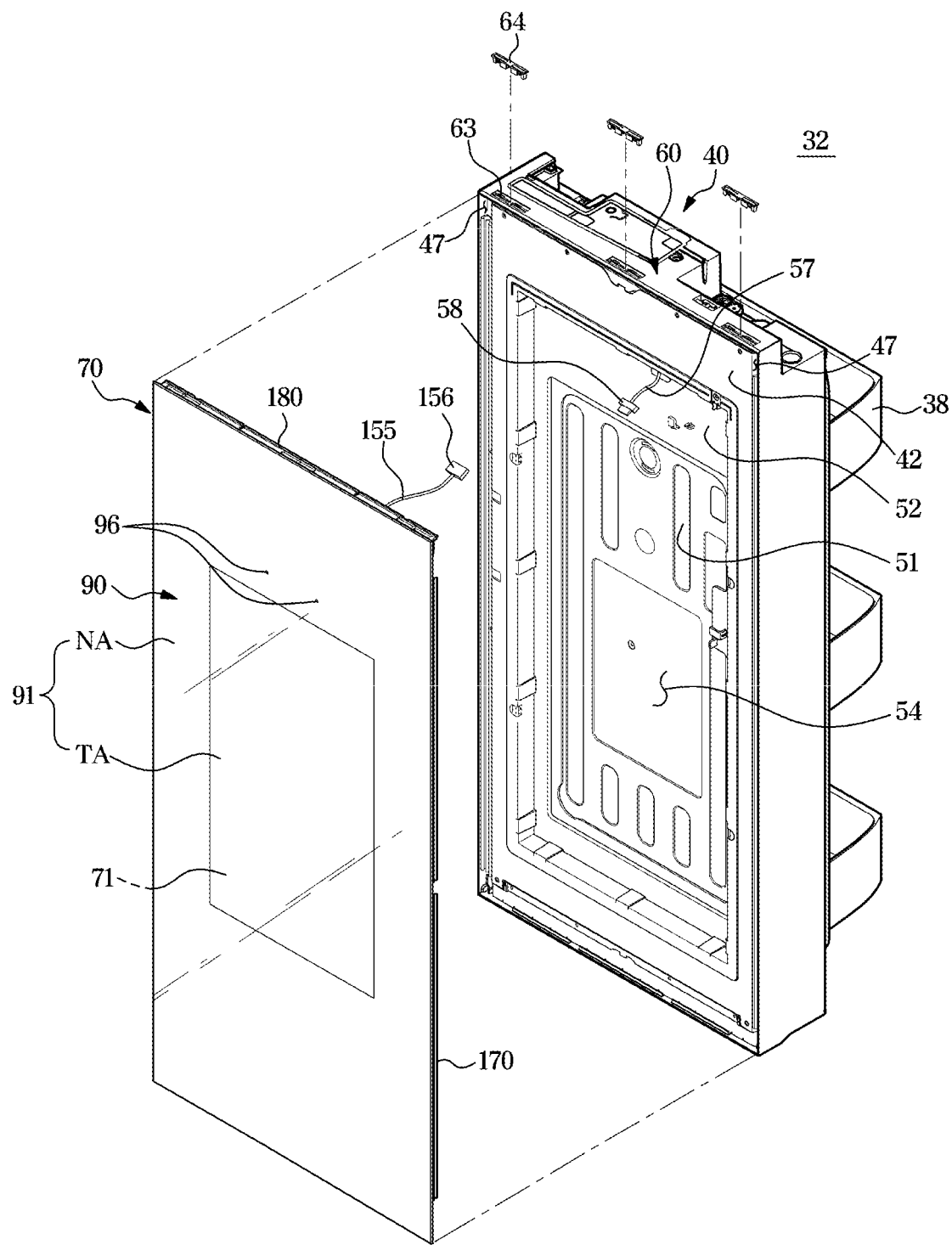
FIG. 3 illustrates a view of a state in which a door of the refrigerator of FIG. 1 is divided into a door body and a front panel.
Figure 4:
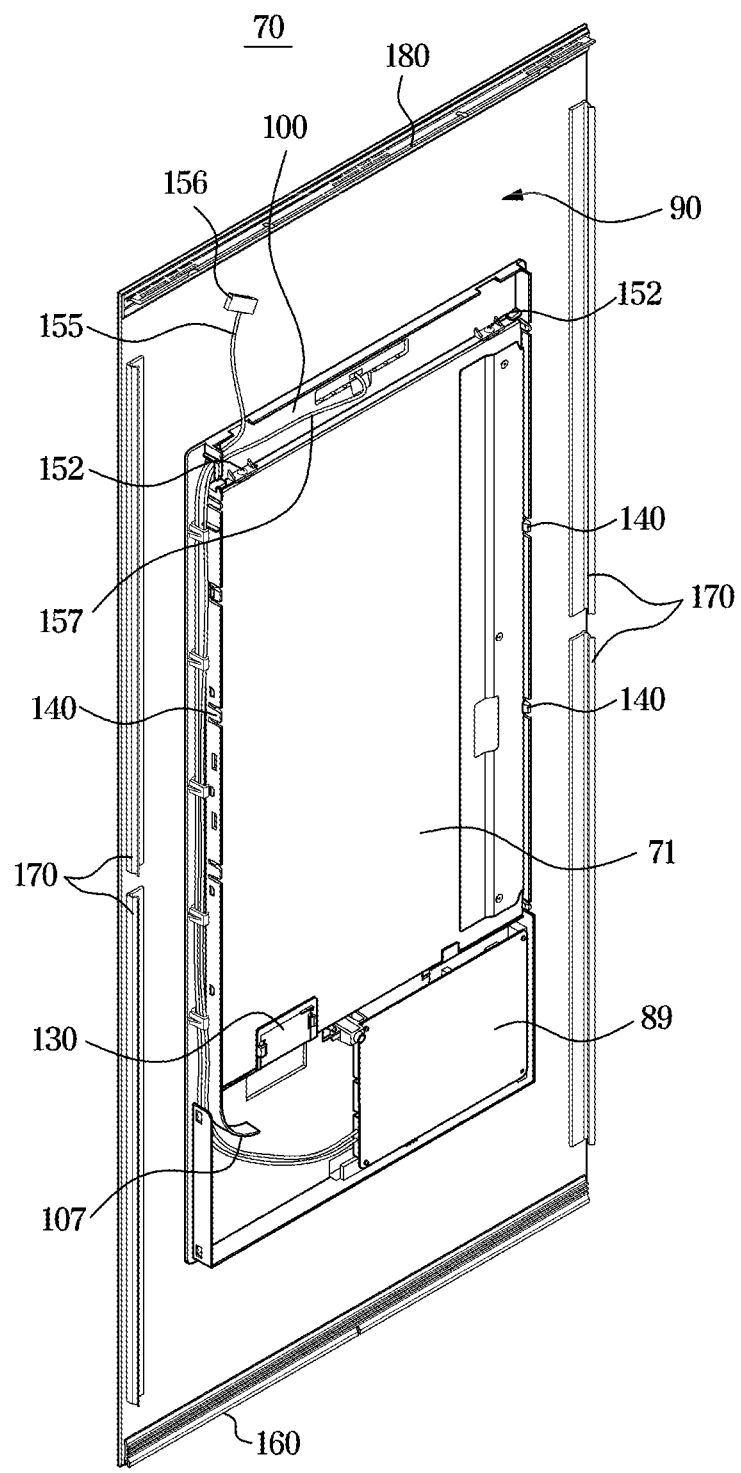
FIG. 4 illustrates a rear perspective view of the front panel of the refrigerator of FIG. 1.
Figure 5:
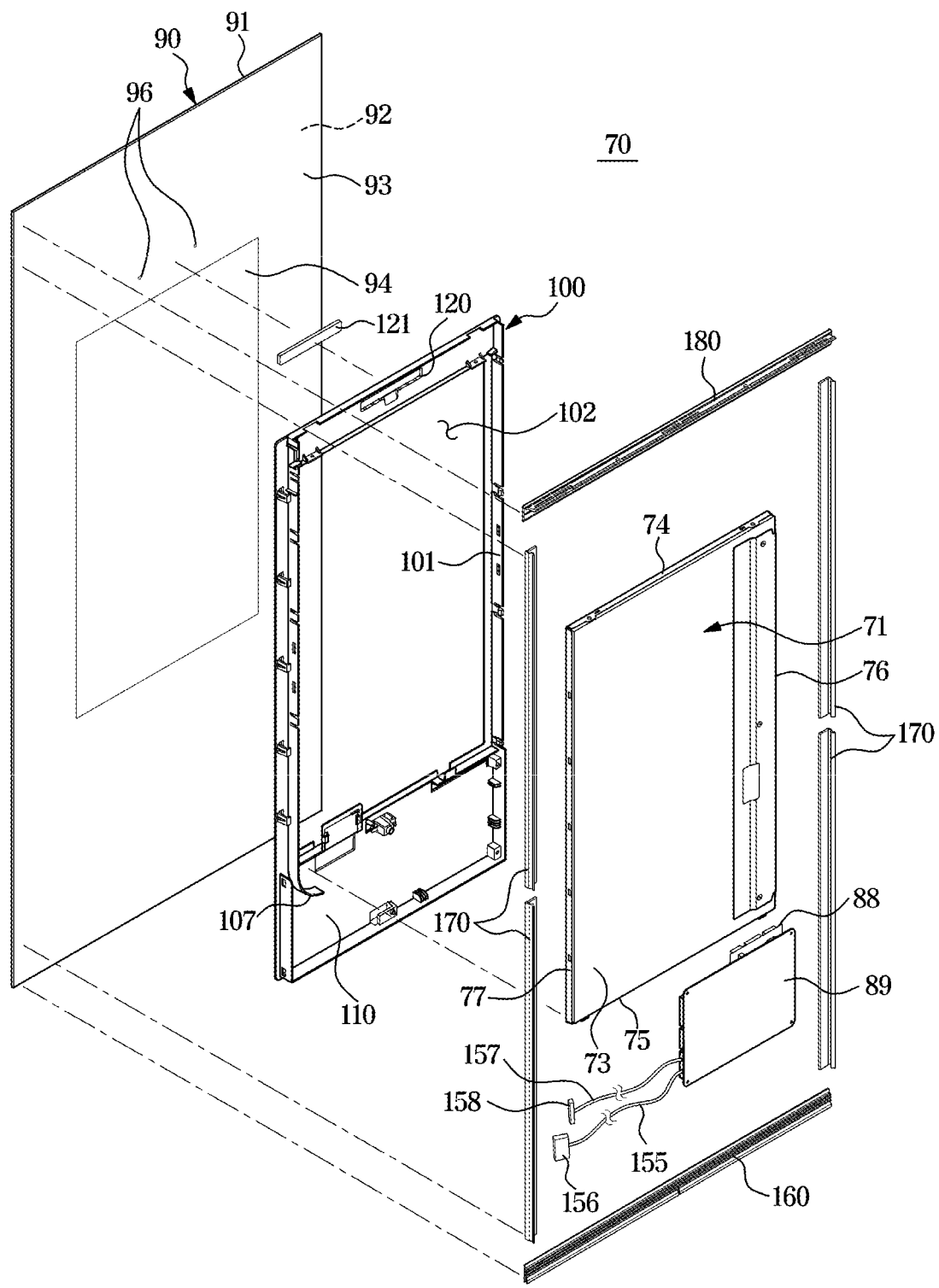
FIG. 5 illustrates a rear perspective view of a state in which the front panel of the refrigerator of FIG. 1 is exploded.
Figure 6:
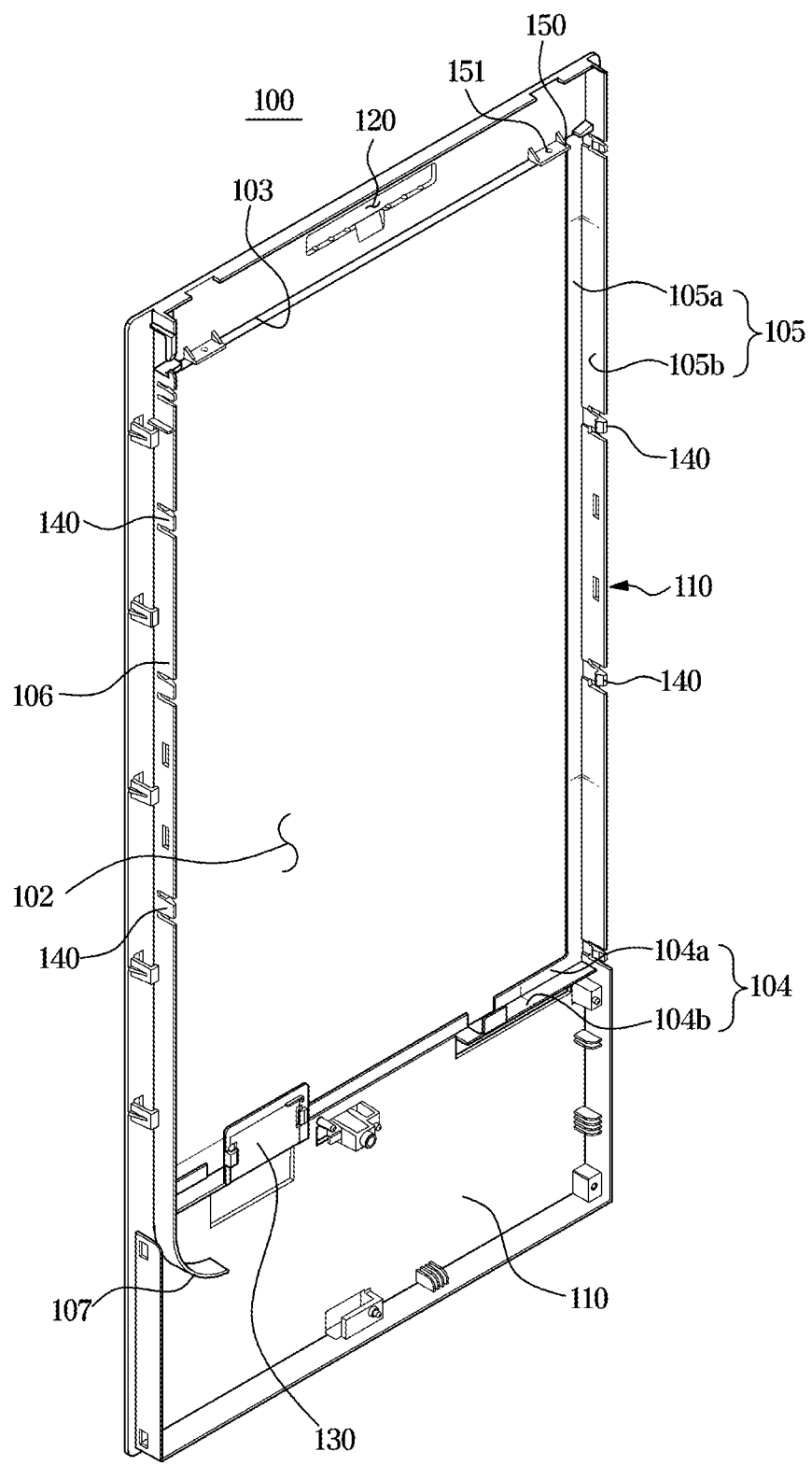
FIG. 6 illustrates a rear perspective view of a support plate of the refrigerator of FIG. 1.
Figure 7:
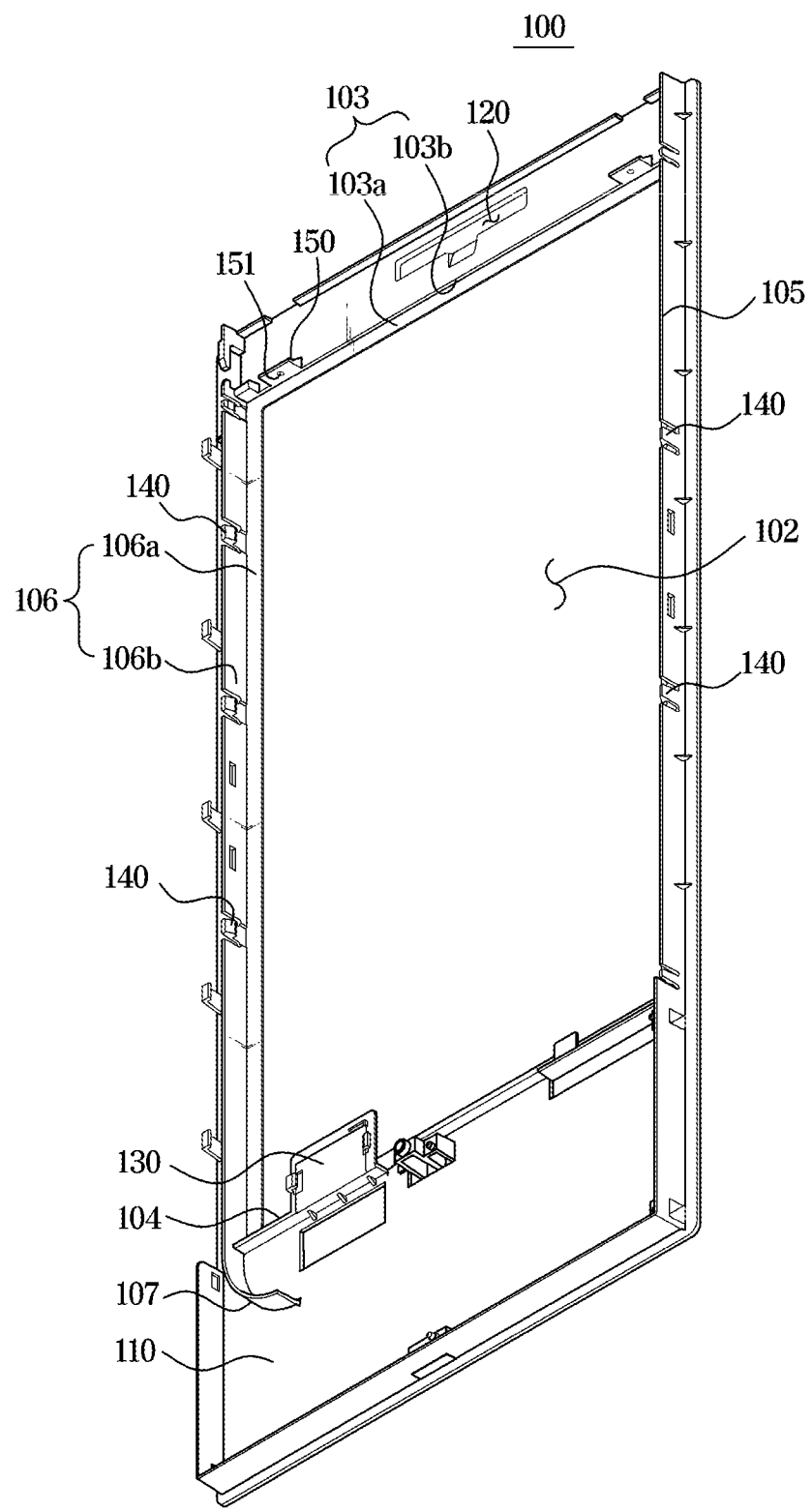
FIG. 7 illustrates a rear perspective view of the support plate of the refrigerator of FIG. 1, when viewed from a different angle from FIG. 6.
Figure 8:
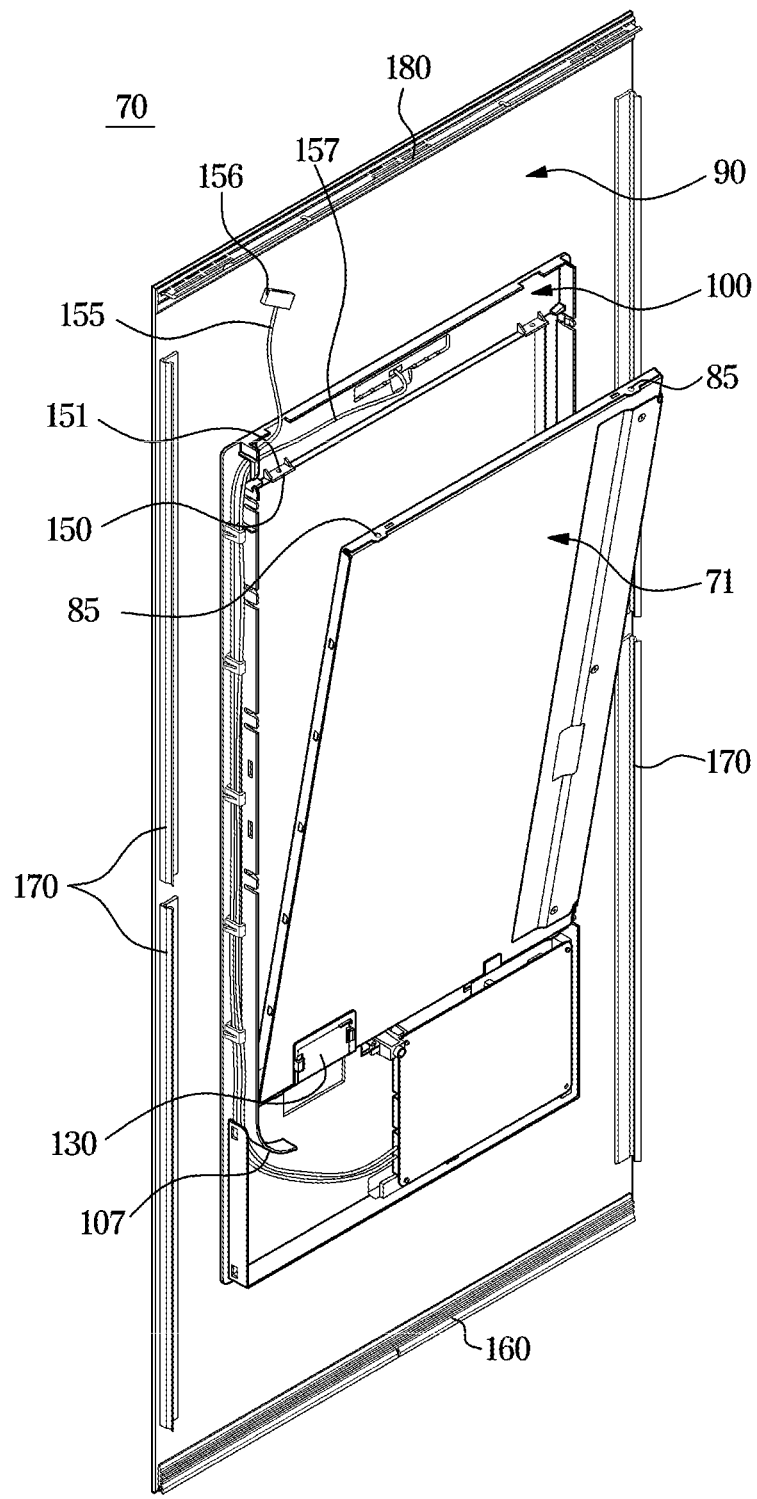
FIG. 8 illustrates a view of an operation of mounting the display to the support plate of the refrigerator of FIG. 1.
Figure 9:
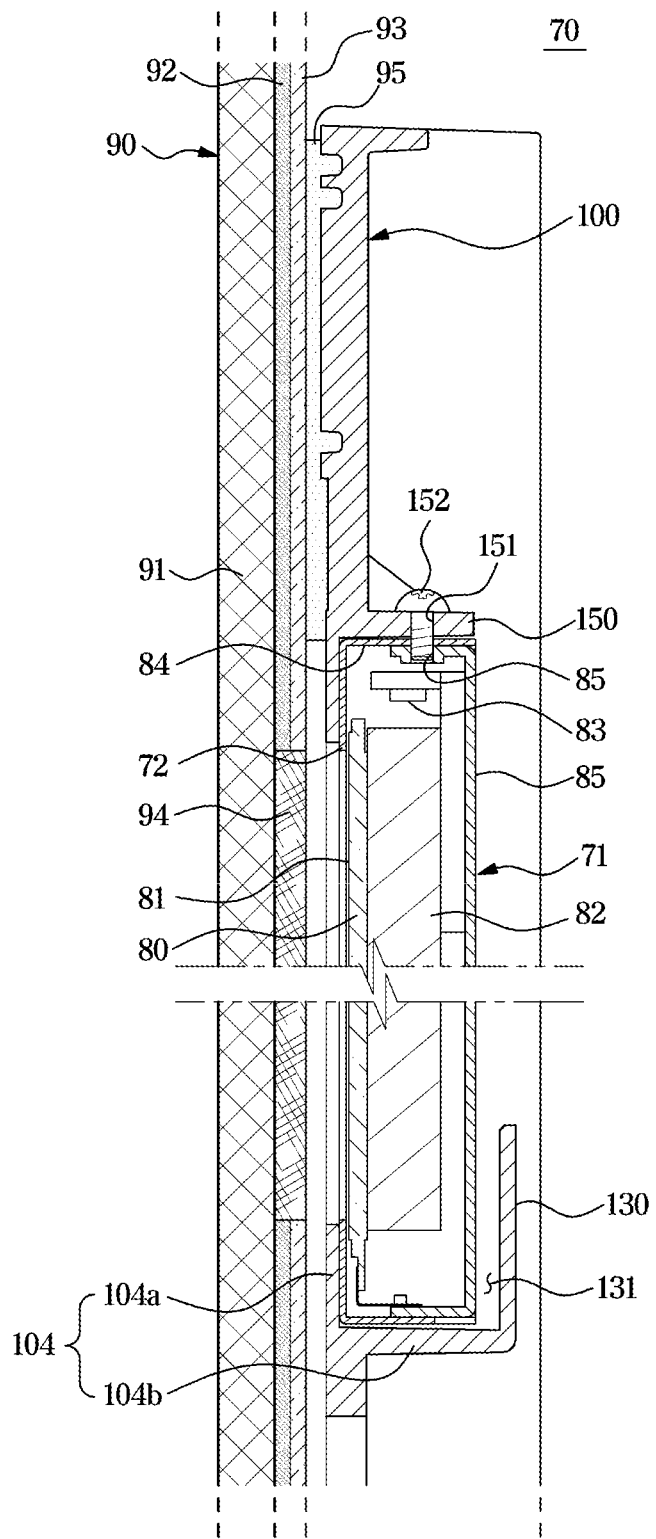
FIG. 9 illustrates a longitudinal sectional view of the front panel of the refrigerator of FIG. 1.
Figure 10:
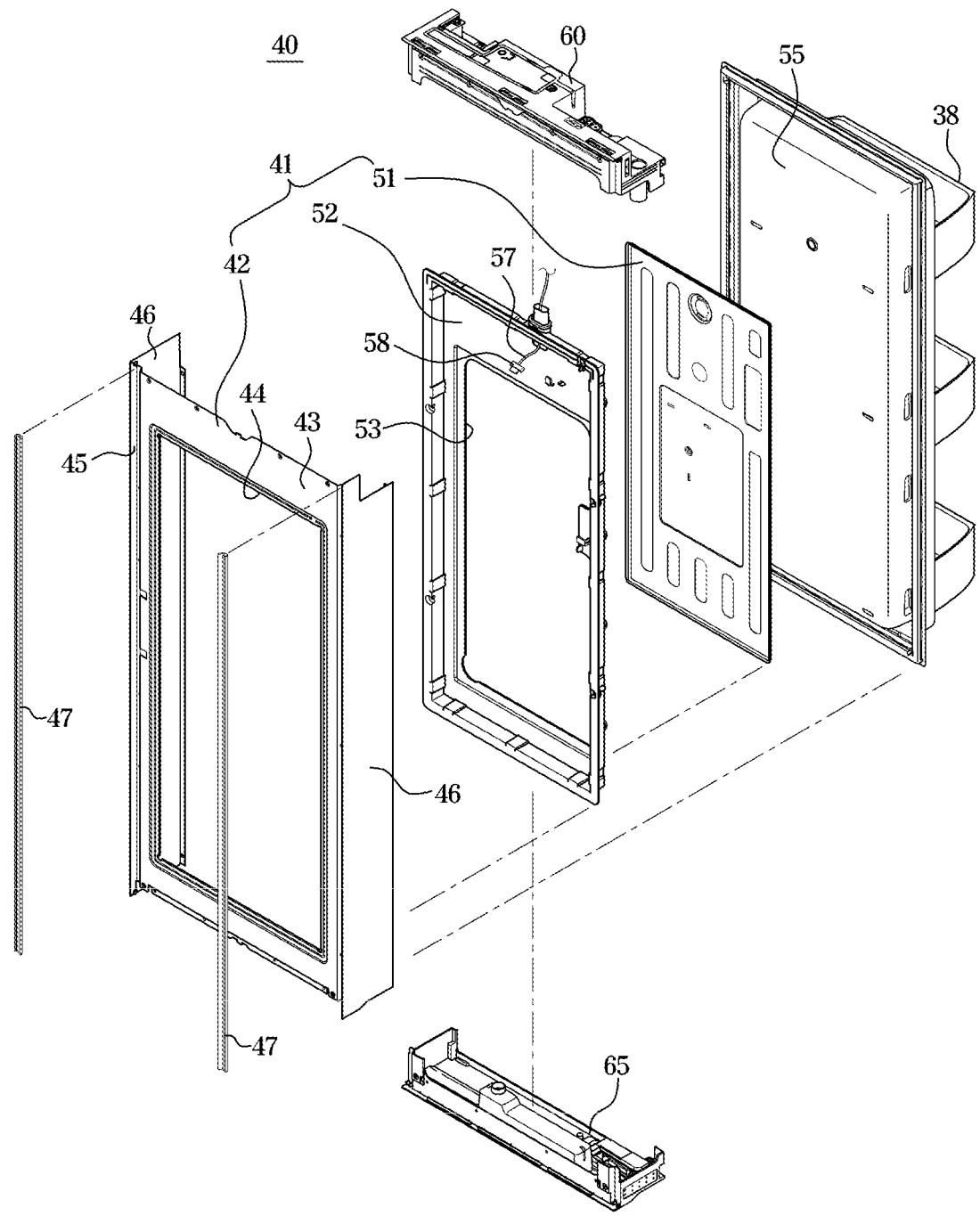
FIG. 10 illustrates an exploded view of the door body of the refrigerator of FIG. 1.
Figure 11:
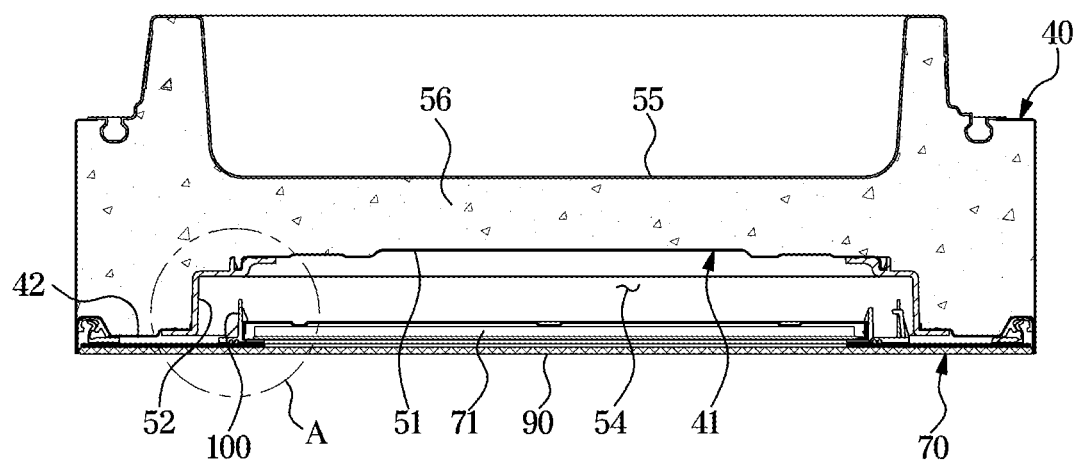
FIG. 11 illustrates a cross-sectional view of the door of the refrigerator of FIG. 1.
Figure 12:
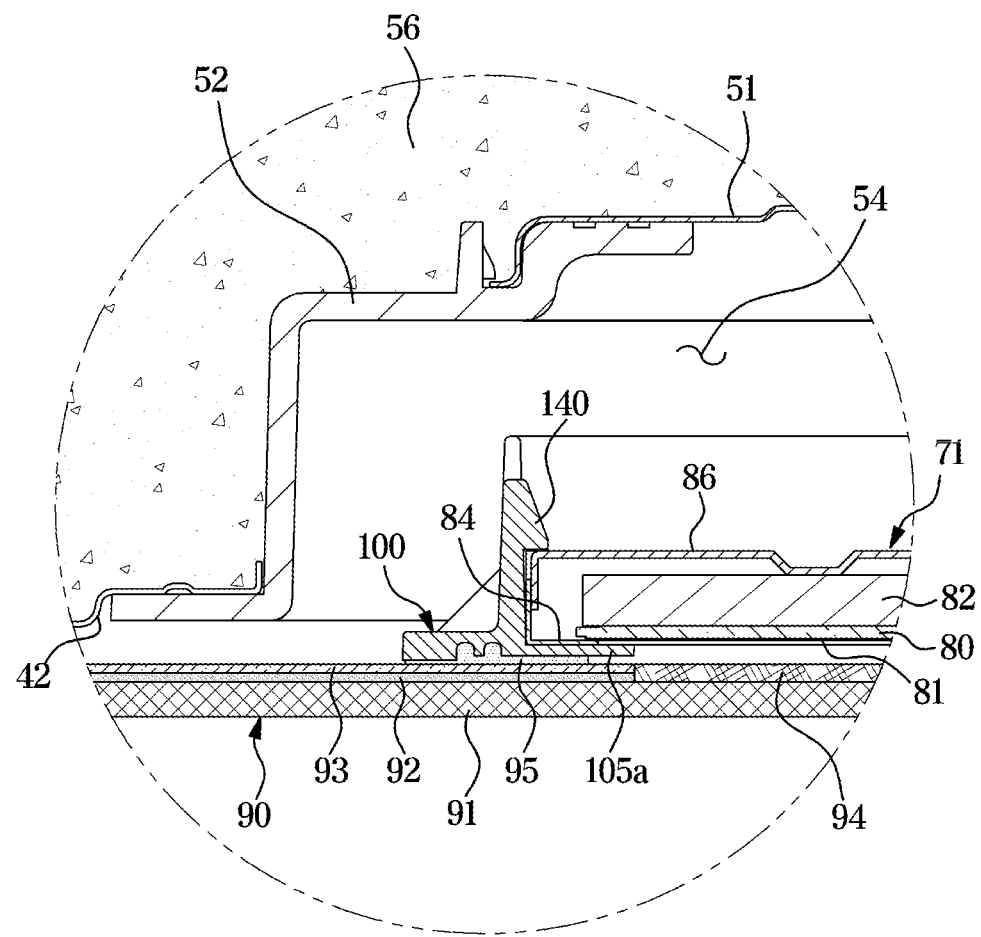
FIG. 12 illustrates an enlarged view of a part 'A' of FIG. 11.

FIG. 3 illustrates a view of a state in which a door of the refrigerator of FIG. 1 is divided into a door body and a front panel. FIG. 4 illustrates a rear perspective view of the front panel of the refrigerator of FIG. 1. FIG. 5 illustrates a rear perspective view of a state in which the front panel of the refrigerator of FIG. 1 is exploded. FIG. 6 illustrates a rear perspective view of a support plate of the refrigerator of FIG. 1. FIG. 7 illustrates a rear perspective view of the support plate of the refrigerator of FIG. 1, when viewed from a different angle from FIG. 6. FIG. 8 illustrates a view of an operation of mounting the display to the support plate of the refrigerator of FIG. 1. FIG. 9 illustrates a longitudinal sectional view of the front panel of the refrigerator of FIG. 1. FIG. 10 illustrates an exploded view of the door body of the refrigerator of FIG. 1. FIG. 11 illustrates a cross-sectional view of the door of the refrigerator of FIG. 1. FIG. 12 illustrates an enlarged view of a part 'A' of FIG. 11.

Referring FIG. 3 and FIGS. 10 to 12, the door 32 may include a door body 40, and a front panel 70 coupled to a front surface of the door body 40 and provided with the display 71.

The door body 40 may be rotatably coupled to the main body 10. The door body 40 may include a door outer case 41, a door inner case 55, an upper cap 60, and a lower cap 65. The door outer case 41, the door inner case 55, the upper cap 60, and the lower cap 65 may be coupled to each other to form an inner space, and an insulating material 56 may be provided in the inner space.

The door outer case 41 may include a main case 42 including a central opening 44, and heat dissipation plates 51 and 52 coupled to the central opening 44 to dissipate heat radiated from the display 71.

The main case 42 may include a front portion 43 forming the front surface of the door body 40 and a side portion 46 forming left and right side surfaces of the door body 40. The front portion 43 and the side portion 46 may be integrally formed. The central opening 44 may be formed in the center of the front portion 43. A mounting groove 45, to which a holder 47 for coupling with the front panel 70 is mounted, may be formed on left and right side edges of the front portion 43.

The heat dissipation plates 51 and 52 may include a display accommodating portion 54 (refer to FIGS. 11 and 12) formed to be recessed to accommodate the display 71. The display accommodating portion 54 may be formed to be wider than a space occupied by the display 71 so as to form an air insulating layer configured to prevent heat, which is radiated from the display 71, from being transmitted.

The heat dissipation plates 51 and 52 may include a first heat dissipation plate 51 and a second heat dissipation plate 52 coupled to an outer periphery of the first heat dissipation plate 51. The second heat dissipation plate 52 may include an opening 53 provided in the center of the heat second dissipation plate 52, and the first heat dissipation plate 51 may be coupled to the opening 53 of the second heat dissipation plate 52.

The first heat dissipation plate 51 may be formed of a material having higher thermal conductivity than the second heat dissipation plate 52. For example, the first heat dissipation plate 51 may be formed of a metal material, and the second heat dissipation plate 52 may be formed of a plastic material.

Accordingly, heat radiated from the display 71 may be guided to the second heat dissipation plate 52, which is provided on the outside of the first heat dissipation plate 51, through the first heat dissipation plate 51, and thus the heat may be prevented from being transferred to the storage compartment 21.

As mentioned above, the reason why the heat dissipation plates 51 and 52 are formed by coupling the first heat dissipation plate 51 with the second heat dissipation plate 52 is easy to assemble the heat dissipation plates 51 and 52 and the main case 42. However, unlike an embodiment, the heat dissipation plate may be integrally formed.

Referring to FIGS. 3 to 5, and FIGS. 9 and 12, the front panel 70 may include the display 71 provided with a screen 81 on which an image is displayed, a glass panel 90 provided in front of the display 71, and a support plate 100 coupled to a rear surface of the glass panel 90 and to which the display 71 is mounted.

The front panel 70 is provided to cover an entire area of the front surface of the door body 40. That is, the front panel 70 may be formed to have a size corresponding to a size of the front surface of the door body 40. Accordingly, the door body 40 may be covered by the front panel 70.

The front panel 70 may be provided to be easily coupled to and detachable from the door body 40.

The glass panel 90 may include a glass member 91 and a decorative layer 92 formed on a rear surface of the glass member 91.

The glass member 91 may include glass or a plastic formed of a transparent material such as glass. The glass member 91 may be formed to have a size corresponding to the size of the front surface of the door body 40 so as to cover the entire area of the front surface of the door body 40.

The glass member 91 may include a transparent area (TA) and a non-transparent area (NA) by the decorative layer 92 formed on the rear surface of the glass member 91. The transparent area (TA) is a region on which the decorative layer 92 is not formed, and thus through the transparent area (TA), the screen 81 of the display 71 arranged behind the glass panel 90 may be exposed. The non-transparent area (NA) is a region on which the decorative layer 92 is formed, and thus through the non-transparent area (NA), a pattern and color of the decorative layer 92 may be seen.

The glass panel 90 may further include a shatterproof film 93 configured to prevent the glass member 91 from being shattered in response to the glass member 91 being broken. The shatterproof film 93 may be provided on the rear surface of the decorative layer 92 of the non-transparent area (NA).

The glass panel 90 may further include a touch film 94 configured to receive a signal for the display 71. The touch film 94 may be provided in the transparent area (TA) of the rear surface of the glass member 91 so as to correspond to the screen 81 of the display 71.

A thickness of the touch film 94 may be formed to correspond to the sum of a thickness of the decorative layer 92 and a thickness of the shatterproof film 93.

A microphone 121 configured to receive a voice may be provided on the front panel 70. The microphone 121 is disposed behind the glass panel 90, and a through hole 96 may be formed in the glass panel 90 to receive a voice through the microphone 121.

Referring to FIG. 5, the support plate 100 may be formed to have a size less than a size of the glass panel 90 so as to be covered by the glass panel 90. The support plate 100 may be fixed to the rear surface of the glass panel 90 through an adhesive 95, such as silicone or hot melt.

The support plate 100 may include a display mounting portion 101 on which the display 71 is mounted. The support plate 100 may include a substrate mounting portion 110 on which a circuit board 88 configured to drive the display 71 is mounted. The substrate mounting portion 110 may be formed in a box shape with an open rear surface.

The substrate mounting portion 110 may be formed under the display mounting portion 101. Accordingly, because the circuit board 88 is not overlapped on the display 71 and is disposed in parallel, the thickness of the front panel 70 may be reduced. The front panel 70 may include a substrate cover 89 configured to cover the circuit board 88 mounted on the substrate mounting portion 110. However, unlike an embodiment, the circuit board 88 may be mounted on the door body 40 rather than the front panel 70.

The support plate 100 may include a microphone mounting portion 120 on which the microphone 121 is mounted. The microphone mounting portion 120 may be provided above the display mounting portion 101.

The display 71 may be mounted on the display mounting portion 101 of the support plate 100 after the support plate 100 is fixed to the rear surface of the glass panel 90. That is, the display 71 may be mounted on the display mounting portion 101 in a direction from the rear to the front. With the structure as described above, the display 71 may be easily mounted, and further, the display 71 may be removed and replaced without removing the support plate 100 from the glass panel 90 even when the assembly of the front panel 70 is completed.

As described above, the support plate 100 may be positioned between the glass panel 90 and the display 71, and thus the support plate 100 may include an opening 102 having a size corresponding to the screen 81 of the display 71 to prevent the screen 81 of the display 71 from being covered by the support plate 100. With this configuration, the entire front surface of the front panel 70 may be formed of the glass panel 90, and the display 71 may be integrated with the glass panel 90 through the support plate 100. Accordingly, an aesthetic aspect may be improved because a gap is not generated in the front panel 70 and a seam due to the gap is not recognized.

The front panel 70 may include trims 160, 170, and 180 coupled to the rear surface of the glass panel 90 to mount the front panel 70 to the door body 40.

Referring to FIGS. 5 and 9, the display 71 may be formed in a rectangular shape elongated in a substantially up and down direction. However, unlike an embodiment, the display 71 may be formed be elongated in a left and right direction or in a shape other than a rectangle.

The display 71 may have a front surface 72, a rear surface 73, an upper surface 74, a lower surface 75, a left surface 76, and a right surface 77.

In another aspect, the display 71 may include a display panel 80 including the screen 81 on which an image is displayed. The display panel 80 may be a liquid crystal (LCD) panel, and the display 71 may include a backlight unit configured to supply light to the display panel 80. The backlight unit may include a light source 83 configured to emit light and a light guide plate 82 configured to guide the light emitted from the light source 83 to the display panel 80. The display 71 may include chassis 84 and 86 configured to accommodate the display panel 80 and the backlight unit. The chassis 84 and 86 may include a front chassis 84 and a rear chassis 86.

A detailed configuration of the display mounting portion 101 of the support plate 100 and an operation in which the display 71 is mounted to the display mounting portion 101 will be described with reference to FIGS. 6 to 9.

The display mounting portion 101 may have a rectangular frame shape. The display mounting portion 101 may include an upper support portion 103, a lower support portion 104, a left support portion 105, and a right support portion 106 which are configured to support an upper end, a lower end, a left end, and a right end of the display 71, respectively. The upper support portion 103, the lower support portion 104, the left support portion 105, and the right support portion 106 may respectively include a first support portion 103*a*, 104*a*, 105*a*, and 106*a* which is configured to prevent the display 71 from being moved to the glass panel 90 side. The first support portions 103*a*, 104*a*, 105*a*, and 106*a* may support a front edge of the display 71.

Further, the upper support portion 103, the lower support portion 104, the left support portion 105, and the right support portion 106 may respectively include a second support portion 103*b*, 104*b*, 105*b*, and 106*b* which is configured to prevent the display 71 from being moved in in four directions of up, down, left and right. The second support portions 103*b*, 104*b*, 105*b*, and 106*b* may support the upper surface 74, the lower surface 75, the left surface 76, and the right surface 77 of the display 71, respectively.

The support plate 100 may include a guide rib 130 configured to guide the display 71 to the display mounting portion 101. The guide rib 130 may be formed in a lower portion of the display mounting portion 101. The guide rib 130 may be formed to protrude upward from an end of the second support portion 104*b* of the lower support portion 104. However, unlike an embodiment, the guide rib 130 may be formed in the side portion and the upper portion of the display mounting portion 101.

The guide rib 130 may form a guide groove 131 (refer to FIG. 9) together with the lower support portion 104. The guide rib 130 may guide the display 71 to be inserted into the guide groove 131.

The support plate 100 may include a locking hook 140 provided to be elastically deformable to fix the display 71 mounted on the display mounting portion 101. The locking hook 140 may be formed on the left support portion 105 and the right support portion 106 of the display mounting portion

101. The locking hook 140 may be provided in plural along a longitudinal direction of the left support portion 105 and the right support portion 106. Alternatively, the locking hook 140 may be formed in the upper support portion 103 and the lower support portion 104.

The locking hook 140 may be elastically deformed to be opened to the outside in a process in which the display 71 is mounted to the display mounting portion 101, and the locking hook 140 may be restored to its original state in response to the completion of the process in which the display 71 is mounted to the display mounting portion 101.

Unless the display 71 is pulled with a predetermined or more external force, the locking hook 140 may be provided to be locked to the rear surface 73 of the display 71 to prevent the display 71 from being separated from the display mounting portion 101.

The support plate 100 may include a fastening hole 151, to which a fastening member 152 is coupled, so as to fix the display 71 to the display mounting portion 101. The fastening hole 151 may be formed in the upper support portion 103 of the display mounting portion 101 or in the bracket 150 protruding from the upper support portion 103. In the chassis 84 of the display 71, a fastening hole 85 may be formed at a position corresponding to the fastening hole 151 of the support plate 100, so as to allow the fastening member 152 to be coupled thereto.

A process of mounting the display 71 to the display mounting portion 101 of the support plate 100 according to the above mentioned configuration is as follows.

As shown in FIG. 8, the display 71 is tilted and then the lower end of the display 71 is inserted into the guide groove 131.

In response to pushing the upper end of the display 71 into the display mounting portion 101, the locking hook 140 is opened and the display 71 is mounted on the display mounting portion 101. In response to the completion of the mounting of the display 71, the locking hook 140 is restored and then locked to the rear surface 73 of the display 71.

In response to coupling the fastening member 152 to the fastening hole 151 of the support plate 100 and the fastening hole 85 of the display 71, the display 71 may be fixed.

The support plate 100 may include a first wire cable 155 configured to electrically connect the circuit board 88 to an external power source (not shown), and a cable guide 107 configured to guide a second wire cable 157 configured to electrically connect the circuit board 88 to the microphone 121. The cable guide 107 may be formed to be rounded near the substrate mounting portion 110.

The first wire cable 155 and the second wire cable 157 extending from the circuit board 88 may be turned upward by the cable guide 107, and then may be guided to the upper side of the support plate 100 by the right support portion 106 or the left support portion 105 of the display mounting portion 101.

A first connector 156 may be provided at an end of the first wire cable 155, and a second connector 158 may be provided at an end of the second wire cable 157.

In response to coupling between the front panel 70 and the door body 40, the first connector 156 may be connected to a door body connector 58 provided on the door body 40. The door body connector 58 may be electrically connected to an external power source by a third wire cable 57. The second connector 158 may be connected to the microphone 121.

Figure 13:
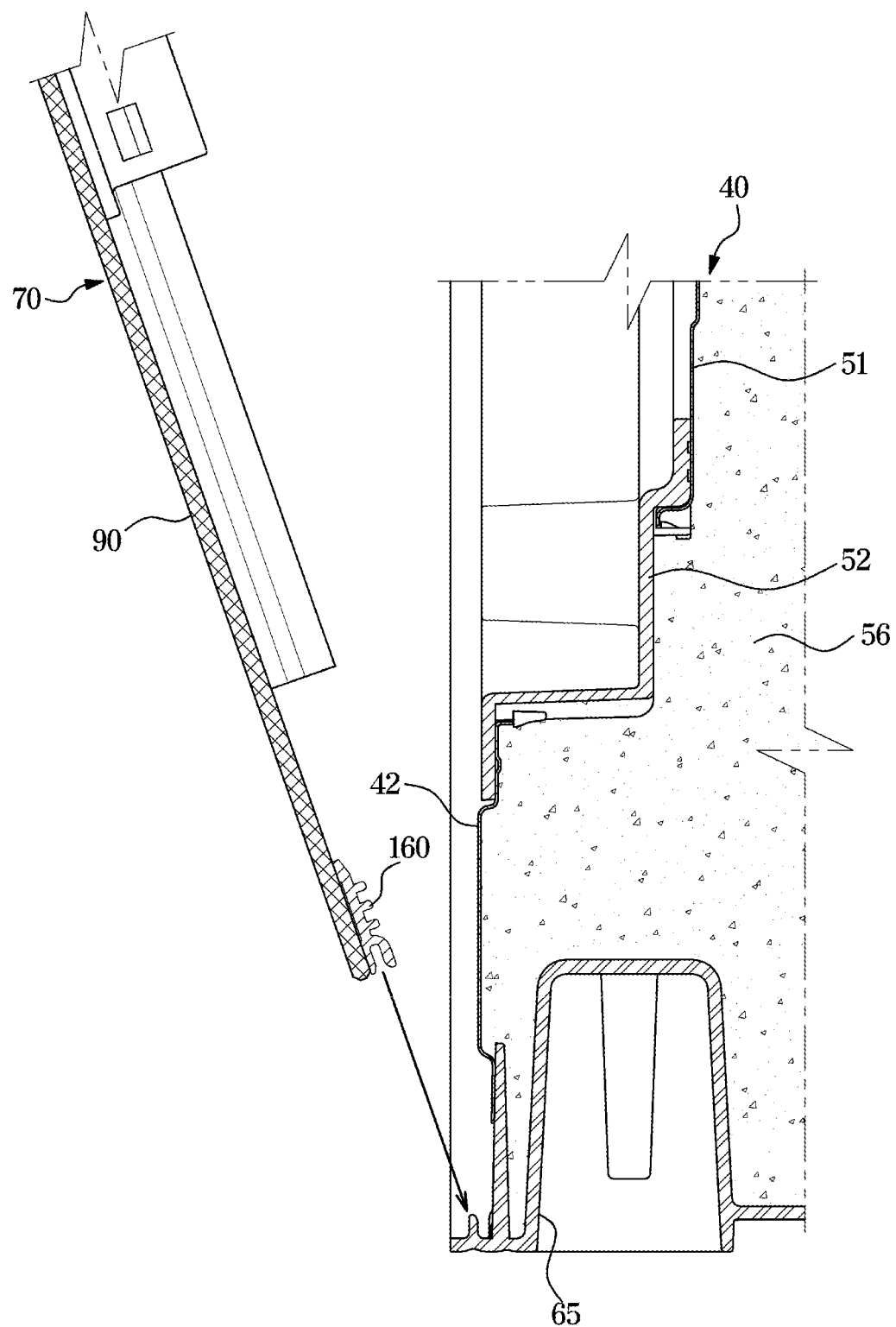
FIG. 13 illustrates a view of an operation of coupling a lower portion of the front panel of the refrigerator of FIG. 1 to the door body.
Figure 14:
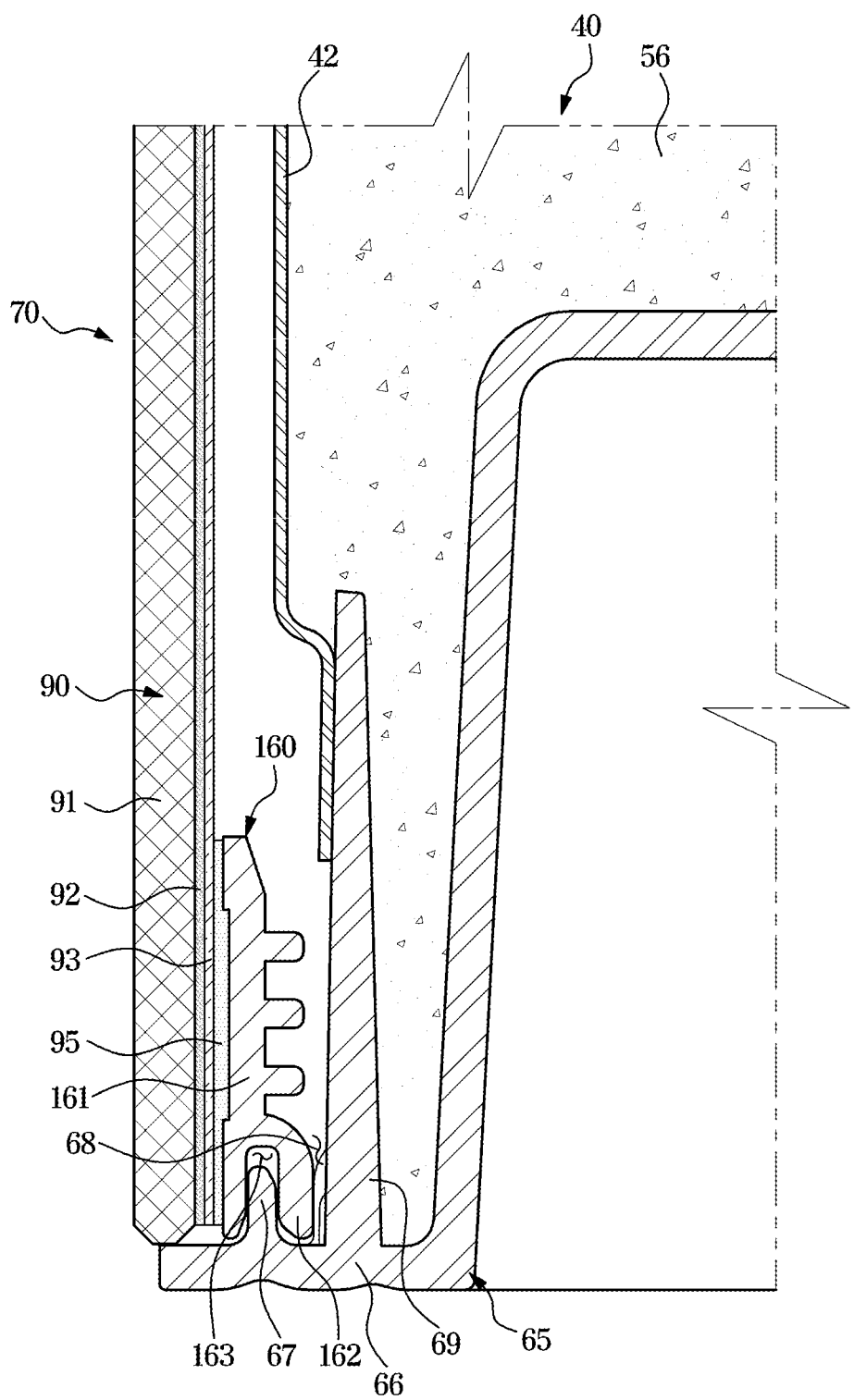
FIG. 14 illustrates a longitudinal cross-sectional view of a coupling structure between the lower portion of the front panel of the refrigerator of FIG. 1 and the door body.
Figure 15:
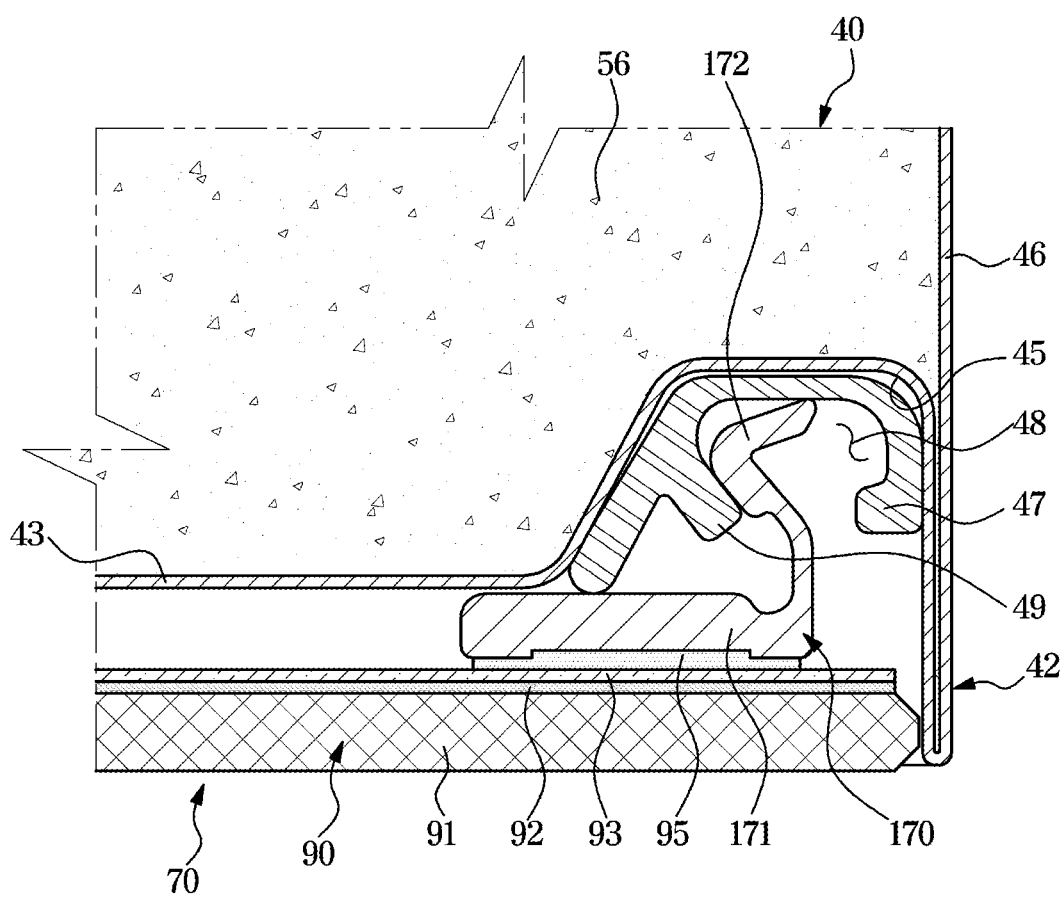
FIG. 15 illustrates a cross-sectional view of a coupling structure between a side portion of the front panel the refrigerator of FIG. 1 and the door body.
Figure 16:
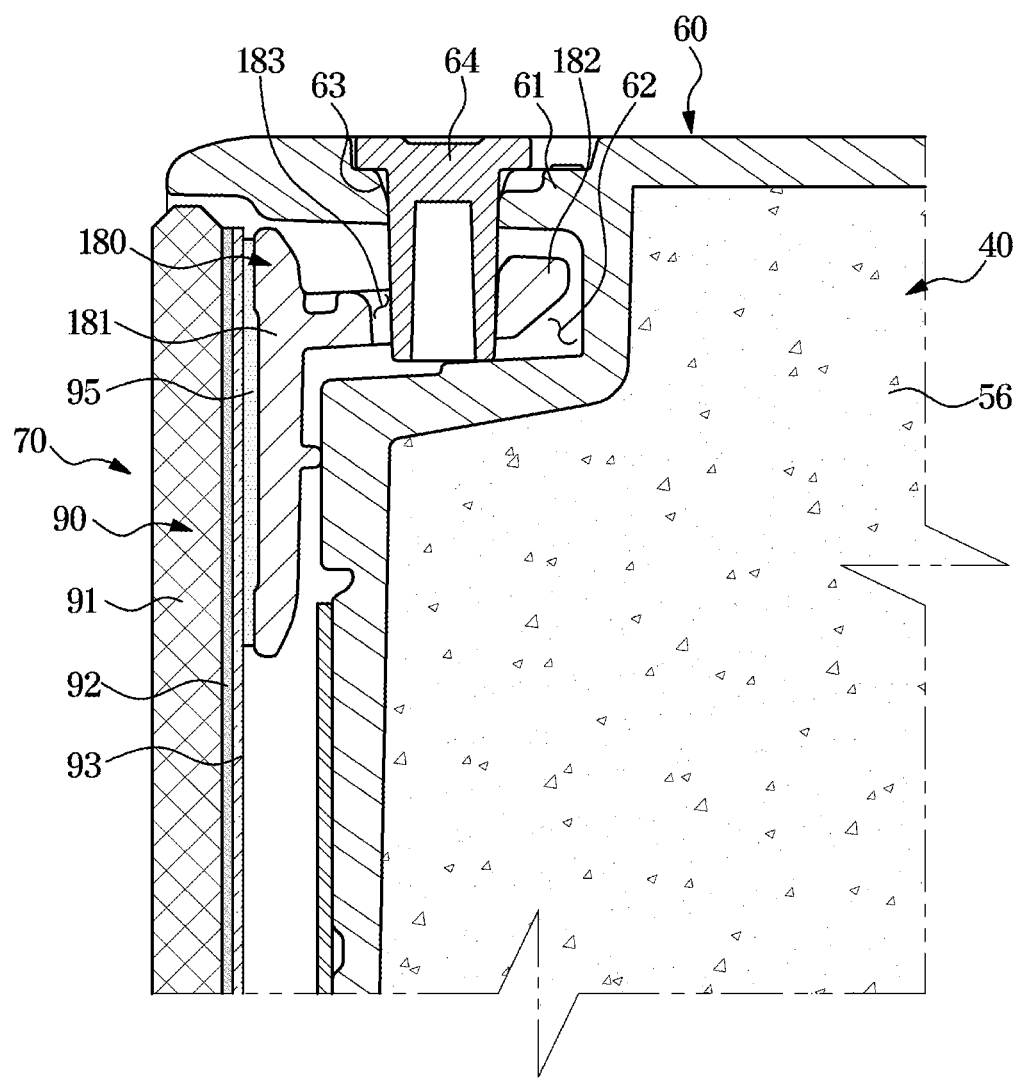
FIG. 16 illustrates a longitudinal cross-sectional view of a coupling structure between an upper portion of the front panel of the refrigerator of FIG. 1 and the door body.

FIG. 13 illustrates a view of an operation of coupling a lower portion of the front panel of the refrigerator of FIG. 1 to the door body. FIG. 14 illustrates a longitudinal cross-sectional view of a coupling structure between the lower portion of the front panel of the refrigerator of FIG. 1 and the door body. FIG. 15 illustrates a cross-sectional view of a coupling structure between a side portion of the front panel the refrigerator of FIG. 1 and the door body. FIG. 16 illustrates a longitudinal cross-sectional view of a coupling structure between an upper portion of the front panel of the refrigerator of FIG. 1 and the door body.

A coupling structure between the front panel 70 and the door body 40 will be described with reference to FIGS. 13 to 16.

The front panel 70 may include the trims 160, 170, and 180 configured to be coupled to the rear surface of the glass panel 90 to mount the front panel 70 to the door body 40. The trims 160, 170, and 180 may include a lower trim 160 extending in a horizontal direction on a lower edge of the rear surface of the glass panel 90, a side trim 170 extending in a vertical direction on opposite side edges of the rear surface of the glass panel 90, and an upper trim 180 extending in the horizontal direction on an upper edge of the rear surface of the glass panel 90.

The lower trim 160, the side trim 170, and the upper trim 180 may be fixed to the rear surface of the glass panel 90 through an adhesive 190, respectively.

The lower trim 160 may include a lower trim body 161, a lower trim protrusion 162, and a lower trim groove 163. The lower trim protrusion 162 may protrude from the lower trim body 161. The lower trim protrusion 162 may have a shape that extends rearward by a predetermined length from the lower trim body 161 and extends substantially in the up and down direction so as to form the lower trim groove 163. The lower trim groove 163 may be formed between the lower trim body 161 and the lower trim protrusion 162.

The lower cap 65 of the door body 40 may include a lower cap body 66, a lower cap protrusion 67, a lower cap rib 69, and a lower cap mounting space 68. The lower cap protrusion 67 may protrude upward from the lower cap body 66. The lower cap protrusion 67 may be formed to be inserted into the lower trim groove 163 of the lower trim 160.

The lower cap rib 69 may protrude upward from the lower cap body 66. The lower cap rib 69 may be formed to be spaced apart from the lower cap protrusion 67 by a predetermined distance. The lower cap rib 69 may guide the lower trim 160 of the front panel 70 to an installation position in response to installing the front panel 70 to the door body 40.

The side trim 170 may include a side trim body 171 and a side trim protrusion 172. The side trim protrusion 172 may protrude from the side trim body 171 and may be provided to be elastically deformable.

The holder 47 mounted on the door body 40 may include a holder groove 48 and a holder protrusion 49. The holder groove 48 may be formed to allow the side trim protrusion 172 of the side trim 170 to be inserted thereto. The side trim protrusion 172 may be elastically deformable to be locked to the holder protrusion 49 in response to being inserted into the holder groove 48 by a predetermined depth or more.

The upper trim 180 may include an upper trim body 181, an upper trim protrusion 182, and an upper trim hole 183. The upper trim protrusion 182 may protrude from the upper trim body 181. The upper trim hole 183 may be formed in the upper trim protrusion 182.

The upper cap 60 of the door body 40 may include an upper cap body 61, an insertion groove 62, and an upper cap hole 63. The insertion groove 62 may be formed to allow the upper trim protrusion 182 of the upper trim 180 to be inserted thereto. In response to inserting the upper trim protrusion 182 to the insertion groove 62, a fixing member 64 may be coupled to the upper cap hole 63 of the upper cap 60 and the upper trim hole 183 of the upper trim protrusion 182, and thus the front panel 70 may be coupled to the door body 40.

A process of coupling the front panel 70 to the door body 40 according to the above mentioned configuration is as follows.

First, the front panel 70 is tilted and the lower cap protrusion 67 is inserted into the lower trim groove 163. In response to rotating the front panel 70 to a direction in which the front panel 70 is stood, the lower cap protrusion 67 may be completely inserted into the lower trim groove 163, and the upper trim protrusion 182 may be inserted into the insertion groove 62 of the upper cap 60. The fixing member 64 is coupled to the upper cap hole 63 of the upper cap 60 and the upper trim hole 183 of the upper trim protrusion 182 from top to bottom. With this configuration, the front panel 70 may be easily coupled to the door body 40, and the front panel 70 may be easily separated from the door body 40 in the reverse order.

The principles and spirit as described above is not applied only to the above-described refrigerator and its door, but may also be applied to a home appliance including a main body including a cavity and a door configured to open and close the cavity, and the door. For example, the principles and spirit may be applied to a cooking appliance including a cooking chamber, a dishwasher including a washing chamber, a clothes care apparatus including a clothes care chamber, a wine cellar including a storage compartment, and an air conditioner.

Although a few embodiments of the disclosure have been shown and described, it would be appreciated by those skilled in the art that changes may be made in these embodiments without departing from the principles and spirit of the disclosure, the scope of which is defined in the claims and their equivalents.

| Description of symbols | |
|---|---|
| 1: refrigerator | 10: main body |
| 21, 22, 23: storage compartment | 31, 32, 33, 34: door |
| 40: door body | 41: door outer case |
| 42: main case | 43: front portion |
| 44: central opening | 46: side portion |
| 51: first heat dissipation plate | 52: second heat dissipation plate |
| 54: display accommodating portion | 55: door inner case |
| 56: insulating member | 57: wire cable |
| 58: door body connector | 70: front panel |
| 71: display | 80: display panel |
| 88: circuit substrate | 89: substrate cover |
| 90: glass panel | 91: glass member |
| TA: transparent area | NA: non-transparent area |
| 92: decorative layer | 93: shatterproof film |
| 94: touch film | 95: adhesive |
| 100: support plate | 101: display mounting portion |
| 102: opening | 110: substrate mounting portion |
| 120: microphone mounting portion | 121: microphone |
| 130: guide rib | 131: guide groove |
| 140: locking hook | 150: bracket |
| 151: fastening hole | 152: fastening member |
| 155: first wire cable | 157: first connector |

-continued

| Description of symbols | |
|---|---|
| 158: second wire cable | 158: second connector |
| 160: lower trim | 170: side trim |
| 180: upper trim | |

What is claimed is:

1. A refrigerator comprising:
a main body; and
a door including a door body and a front panel coupled to a front surface of the door body so as to cover the front surface of the door body, the door configured to open and close a storage compartment in the main body,
wherein the front panel includes:
a display including a screen on which an image is displayable,
a glass panel in front of the display and including a glass member and a decorative layer formed in an area of the glass member other than an area of the glass member corresponding to the screen of the display, and
a support plate coupled to a rear surface of the glass panel and including a display mounting portion on which the display is rear-mounted and an opening through which the screen is exposed so as to be viewable through the area of the glass member corresponding to the screen,
wherein the display mounting portion includes support portions formed around the opening to support a portion of a front surface of the display.

2. The refrigerator of claim 1, wherein the support portions include an upper support portion, a lower support portion, a left support portion, and a right support portion.

3. The refrigerator of claim 1, wherein the support portions are formed to support an edge of the front surface of the display.

4. The refrigerator of claim 1, wherein
the display includes a display panel having the screen and a chassis to support the display panel, and
the support portions are formed to support the chassis.

5. The refrigerator of claim 1, wherein the support portions include protruding portions protruding rearward to be coupled to the display.

6. The refrigerator of claim 5, wherein the display mounting portion includes locking hooks formed on the protruding portions to be elastically deformable to fix the display mounted on the display mounting portion.

7. The refrigerator of claim 1, wherein the display mounting portion includes a guide groove formed at a lower portion of the display mounting portion such that a lower end of the display is inserted into the guide groove.

8. The refrigerator of claim 7, further comprising:
a fastening member to couple an upper portion of the display mounting portion and an upper end of the display when the lower end of the display is inserted into the guide groove.

* * * * *